Nov. 23, 1948.        G. H. ARNOLD        2,454,587
STALL INDICATING WARNING SIGNAL FOR AIRPLANES
Filed April 12, 1946        4 Sheets-Sheet 1
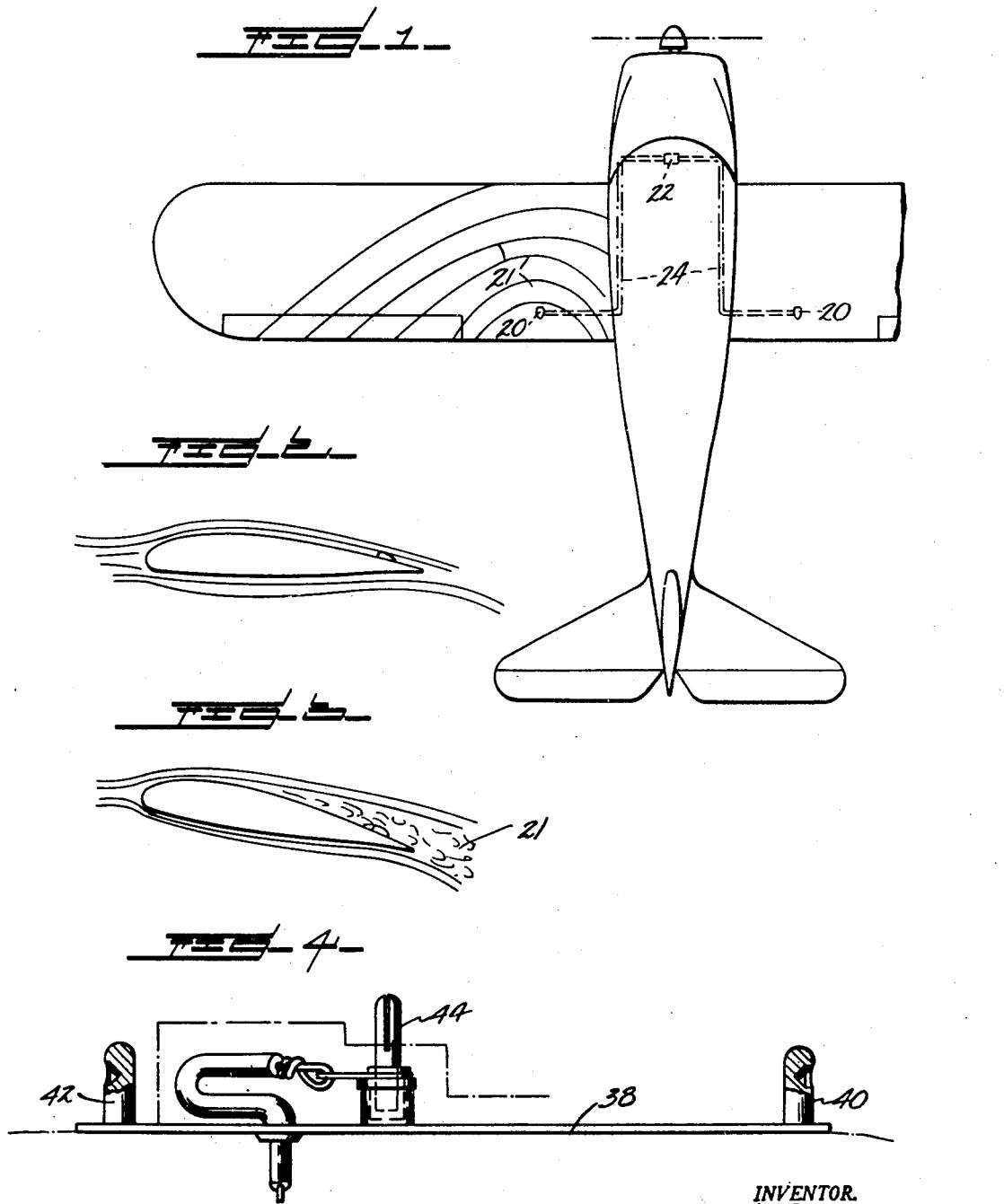
INVENTOR.
GORDON H. ARNOLD
BY
Parker and Burton
ATTORNEYS.

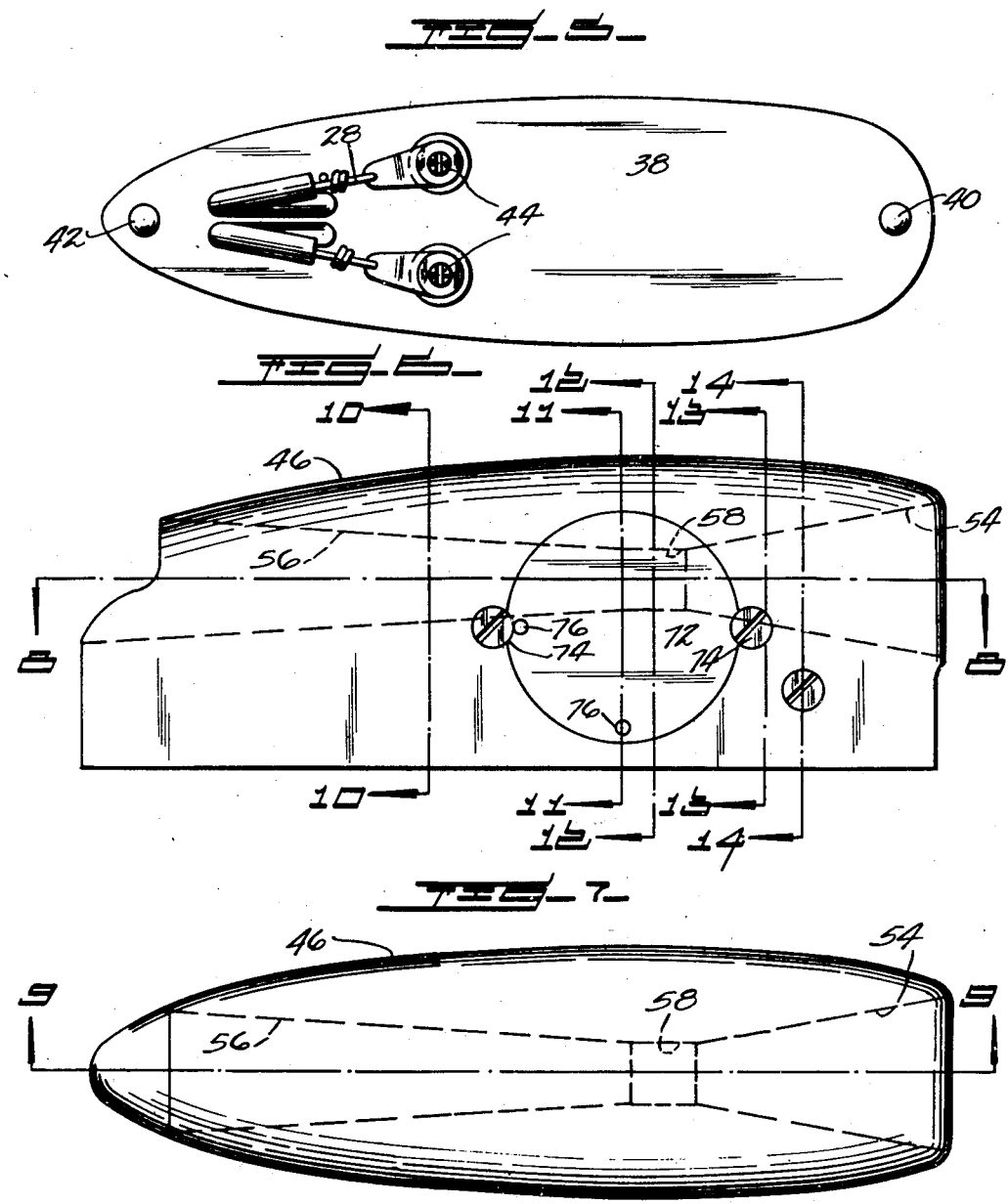

Nov. 23, 1948.　　　　　G. H. ARNOLD　　　　　2,454,587
STALL INDICATING WARNING SIGNAL FOR AIRPLANES
Filed April 12, 1946　　　　　　　　　　　　4 Sheets-Sheet 3
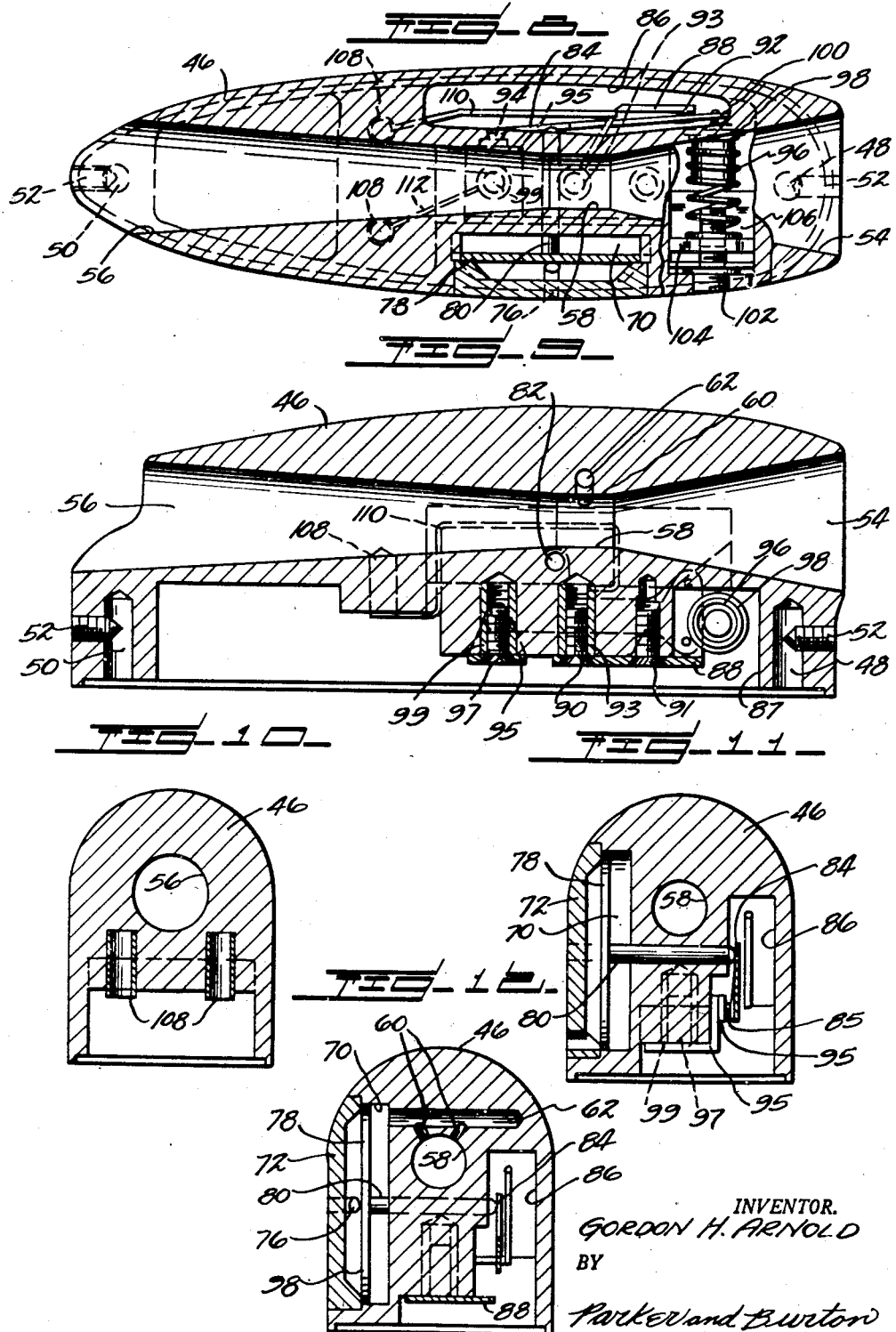
INVENTOR.
GORDON H. ARNOLD
BY
Parker and Burton
ATTORNEYS.

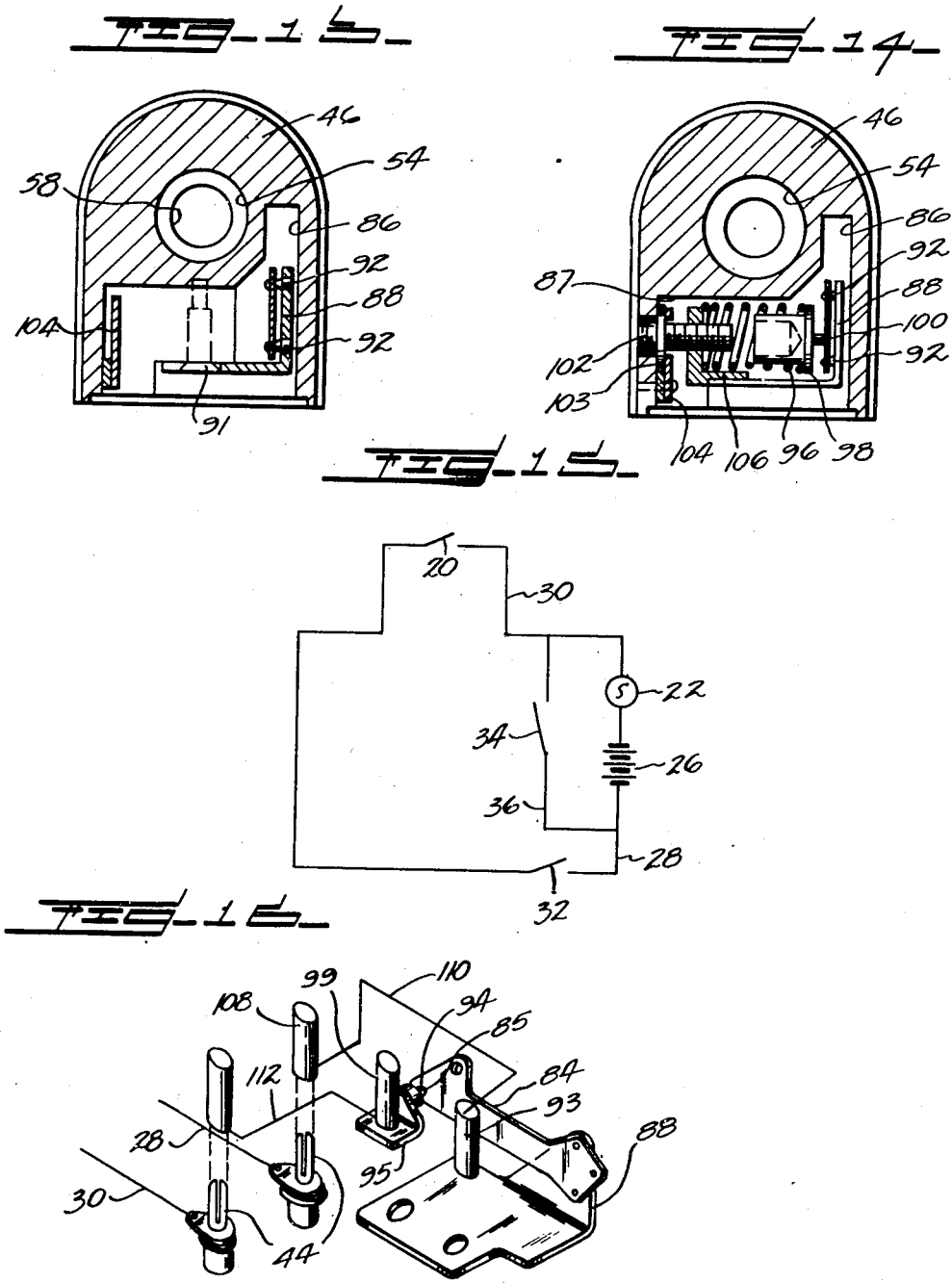

Patented Nov. 23, 1948

2,454,587

UNITED STATES PATENT OFFICE 2,454,587

STALL INDICATING WARNING SIGNAL FOR AIRPLANES

Gordon H. Arnold, Flint, Mich.

Application April 12, 1946, Serial No. 661,601

4 Claims. (Cl. 177—311)

This invention relates to an improved stall indicating warning signal for airplanes.

An object is to provide a warning signal which will indicate to a pilot that plane is approaching a stall.

Another object is to provide a warning indicator of the character described which is of simple construction and capable of being readily attached to any airfoil surface.

Another object is to provide a warning indicator which includes a detector unit mounted upon the upper trailing surface of an airplane wing above the friction influenced boundary layer of air adjacent to the wing when the plane is under conditions of normal flight but which detector unit comes within such boundary layer of air when the plane is approaching a stall.

Under normal flight conditions there is a relatively thin boundary layer of air adjacent to the upper surface of an airplane wing which is influenced by frictional contact with the wing. The speed of this boundary layer of air relative to the wing compared to the speed of the wing through the great body of air is relatively low. When the airplane approaches a stall this boundary layer of air above the upper surface of the wing and particularly adjacent to the trailing edge thereof increases materially in thickness. An object of this invention is to provide a warning signal which includes a detector unit that is mounted upon the upper trailing surface of the wing and spaced thereabove so that under normal flight conditions this unit is disposed above the thin boundary layer of air influenced by frictional contact with the upper surface of the wing. When the wing angle changes as the plane approaches a stall this detector unit comes within the turbulent air layer adjacent to the upper boundary of the wing. This detector unit serves as an airflow operated electric switch to control an electric circuit within which is located a warning signal that gives its warning as the plane approaches a stalled condition.

More particularly the detector unit which is mounted upon the surface of the wing defines a Venturi-shaped air passageway. The restriction of the venturi communicates with mechanism responsive to the increased velocity of the air through the venturi to maintain an electric switch open during normal flight of the plane through the air. When the plane approaches a stalled condition and air from the turbulent boundary layer adjacent to the wing surface flows through the Venturi opening the relative speed of the air falls off so appreciably that the mechanism responsive to the normal flow of air through the restriction of the venturi is overcome and the electric circuit is closed and a warning given.

A further meritorious feature is that the switch mechanism may be adjusted so as to respond to a given variation in air flow in order that the device may be employed with different kinds of airplanes which may tend to stall at different air speeds. Other objects, advantages and meritorious features will more fully appear from the following description, appended claims and accompanying drawings wherein:

Figure 1 is a diagrammatic plan partly broken away of a conventional airplane showing my invention applied thereto, Figure 2 is a diagram of a wing section showing the air flow thereover under normal flying conditions, Figure 3 is a diagram of a wing section showing the air flow thereover when the plane is at the beginning of a stall, Figure 4 is an elevation of the base plate attached to the upper surface of the wing which carries the detector air switch, Figure 5 is a plan of the base plate shown in Figure 4, Figure 6 is a side elevation of the detector body, Figure 7 is a plan of the detector body shown in elevation in Figure 6, Figure 8 is a horizontal sectional view taken on the line 8—8 of Figure 6, Figure 9 is a vertical sectional view taken on the line 9—9 of Figure 7, Figure 10 is a vertical sectional view taken on the line 10—10 of Figure 6, Figure 11 is a vertical sectional view taken on the line 11—11 of Figure 6, Figure 12 is a vertical sectional view taken on the line 12—12 of Figure 6, Figure 13 is a vertical sectional view taken on the line 13—13 of Figure 6, Figure 14 is a vertical sectional view taken on the line 14—14 of Figure 6, Figure 15 is a diagram of the electrical circuit including current conductive parts of the detector switch body and the visual indicator, Figure 16 is a perspective diagram of the electrical circuit connections within the detector switch body.

The detector unit which includes mechanism responsive to the change in the condition of the air over the upper surface of the wing as the plane approaches a stall is indicated as 20 in Figure 1. Two of these detector switch bodies are shown in Figure 1, one upon each wing. Each detector switch body is mounted on the upper surface of the wing facing forwardly and down stream from the leading edge of the wing as shown in such figure of the drawing. Each detector switch is connected with a warning indicator 22 (Figure 1) by an electrical circuit indicated diagrammatically in Figure 1 as 24. The indicator device may be a visual indicator such as an electric light or an audible indicator such as an electric bell. Any suitable warning indicator may be provided. If desired the detector switch might be mounted upon one wing only, though mounting a switch on each wing as shown is preferable.

In Figure 15 a diagram of the electrical circuit is shown including the wing switch 20, the warning indicating light 22, a battery 26, a lead 28 extending from the battery to the wing switch and a return lead 30 between the wing switch and the battery through the light 22. A main control switch 32 is provided and a test switch 34 within a side circuit 36 is shown. The electrical circuit which is included within the wing switch is shown diagrammatically in Figure 16 and will be described in detail hereinafter following the description of the mechanical construction of the detector unit itself.

The detector unit is supported upon the upper surface of the wing upon a base plate 38 which may be secured to the upper surface of the wing in any suitable manner. This base plate is provided with fore and aft securing studs 40 and 42 respectively. A pair of electrical contact studs 44 are carried by the base plate and leads 28 and 30 are connected to these studs. These studs in turn are insulated from the wing. The detector body which is shown in Figures 6 and 7 and indicated generally as 46 is provided as shown particularly in Figure 9 with fore and aft recesses 48 and 50 adapted to receive the fore and aft studs 40 and 42 of the base plate to mount the detector switch body upon the base plate. A fastening screw 52 is associated with each of the recesses 48 and 50 to engage the studs of the base plate to hold the detector body thereon.

The detector switch body is cored out lengthwise to provide a Venturi passageway therethrough having an inlet 54, an outlet 56 and an intermediate throat restriction 58. A pair of passageways 60, Figures 9 and 12, lead from the throat restriction 58 to a cored out passageway 62 which might be termed a manifold. This manifold passageway 62 shown particularly in Figure 12 leads into a cored out chamber 70 which chamber 70 serves as a cylinder closed at the outer side of the body by a head plate 72 held in place by screws 74 or other suitable means to provide an air-tight cylinder except for the air vents 76 shown in Figures 6, 8, 11 and 12.

Mounted within this cylinder 70 is a piston 78. This piston is slidable within the cylinder in response to the suction arising by the accelerated flow of air through the neck 58 of the Venturi passageway as communicated to the cylinder through the passageways 60 and manifold 62 as compared with the air pressure on the outside of the detector unit body communicated through the vents 76 to the opposite side of the piston 78.

The piston 78 is provided with a piston rod 80, shown in Figures 8 and 11, which piston rod extends through a cored out passageway 82 shown in Figure 9 below the neck 58 of the Venturi passageway. The end of the piston rod engages the arm of an electrically conductive lever 84 for a purpose hereinafter described.

The body of the detector unit is cored out at 86 on the opposite side of the Venturi passageway from the cylinder 70 and also below the Venturi passageway and a bracket 88 is secured by screws 90 and 91 to the body. Screw 90 is received within a metal bushing 93 which bushing and screw forms part of an electrical circuit with the bracket itself, the bracket being formed of conductive material. The screw 91 which cooperates with screw 90 to hold the bracket in place does not form any part of the electrical circuit.

This bracket has an angular upright portion as shown in Figures 13 and 14 which exhibits a pair of pivot points 92 which engage recesses provided in the lever 84 as shown particularly in Figures 13 and 14 to pivotally support the lever as shown in Figures 8, 13 and 14. The long arm of the lever 84 extends rearwardly from the pivot points 92 and is engaged between its rear end and the pivot points 92 by the piston rod 80 as shown in Figure 8. The rear end of the long arm of the lever is adapted to normally engage an electrical contact 94 to close the circuit through the detector switch body.

This lever arm 84 is formed of conductive material and as shown in Figure 16 its rear end is provided with a contact point 85 which is adapted to engage the contact point 94 in the circuit. This contact point 94 is carried by an electrically conductive bracket 95 which is shown in Figures 9, 11 and 16 and is held to the detector body by a screw 97. The screw 97 is received within a conductive bushing 99 which bushing makes an electrical contact with the screw and with the bracket. This bushing forms a part of the electrical circuit within the detector switch body as more particularly shown in Figure 16 and hereinafter more particularly described.

Pressure is exerted on the short arm of the lever forwardly of its pivotal support points 92 by a spring 96 as shown particularly in Figures 8 and 14. A cap-shaped plunger 98 is shown in Figure 14 as inserted within and carried by one end of the spring 96. This plunger has a projecting stud 100 that engages within a detent in the short arm of the lever as shown in Figures 8 and 14. This action of the spring holds the short arm of the lever outwardly tending to rock the lever about its pivots 92 and hold the contact point 85 at the rear end of the long arm of the lever inwardly against the electrical contact 94 of bracket 95 to make the circuit through the switch body.

An adjustment is provided for the spring in the form of an adjustment screw 102 which is rotatably supported within the switch body as shown particularly in Figure 14. A mounting is provided which supports the screw for rotation without axial adjustment. This mounting includes a bifurcated plate 104 which overlaps the head 103 of the screw and holds it in place while permitting its rotation.

Mounted upon the screw for threaded adjustment thereover is a cup-shaped slide 106. This slide is shown in Figures 8 and 14 as cut away on its upper side and the spring 96 is mounted within the slide. The slide is held against rotation through being mounted within a part 87 of the cored out passageway 86 as shown particularly in Figures 8 and 14. The end of the screw is received within the end of the spring as shown in Figures 8 and 14. The spring is held compressed between the slide and the cap 98 and this compression of the spring may be varied by operation of the adjustment screw 102.

The purpose of this adjustment is to regulate the pressure that holds the lever arm 84 to close the circuit, or put differently, it determines the suction necessary to withdraw the air piston 78 against the force of the spring to open the circuit. This piston 78 as it is drawn inwardly by suction must move the long arm of the lever outwardly against the force of spring 96 and break the electrical contact formed between contacts 94 and 85.

When the detector switch body 38 is mounted upon the securing studs 40 and 42 of the base plate 38 as hereinabove described the electrical contact studs 44 carried by the base plate will be received within electrically conducting bushings 108 shown in Figures 8, 9, 10 and 16. These conductive bushings 108 form a part of the electrical circuit diagrammatically illustrated in Figure 16.

The electrical circuit within the switch body is diagrammatically illustrated in Figure 16 wherein the electrical contact studs 44 of the base plate are shown as adapted to be received within the bushings 108 mounted within the detector switch body. One bushing 108 is connected by a lead 110 with bushing 93 of the bracket 88 as shown in Figures 16 and 8. The other bushing 108 is connected by a lead 112 with the bushing 99 which contacts the bracket 95 that carries the contact point 94 as shown in Figures 16 and 12. It will be apparent that when the lever 84 is disposed to hold its contact point 85 against the contact point 94 of the bracket 95 that the circuit through the detector switch unit will be closed. This result occurs when the lever is under the influence of the spring 96. However when the piston 78 is withdrawn by suction from the throat 58 of the venturi through passageways 60 and manifold opening 62 the lever arm 88 is pushed outwardly and the contacts 85 and 94 are separated and the circuit through the detector switch body is broken.

The detector unit will be supported on the upper trailing surface of the wing as shown in Figure 1 at such a height that the inlet to the Venturi passageway will normally be disposed above that layer of boundary air adjacent to the wing surface which is influenced by frictional contact of the surface of the wing under normal flight. In one type of conventional plane the median line of the Venturi opening might be disposed three-quarters of an inch above the surface of the wing. Under normal flight, as shown in Figure 2, the boundary layer of air immediately adjacent the upper surface of the wing which is influenced by frictional contact therewith is very thin. As the angle of the wing changes and the plane approaches a stall, as diagrammatically illustrated in Figure 3, this boundary layer of air indicated as 21 in Figure 3 increases substantially in thickness. If the plane went into a complete stall the boundary layer 21 of turbulent air adjacent the wing surface would increase substantially more in thickness. The curved lines 21 in Figure 1 indicate progression of area of stall.

Under normal flight the detector unit 20 is disposed as shown in Figure 2 above the boundary layer of wing friction affected air and within the fast moving stream of air. The air passing through the venturi is then taken from the fast moving stream of air. The movement of this air is accelerated as it flows through the restricted throat of the Venturi passageway. Suction is created through the passageways 60 and 62 and the piston 78 is withdrawn and the piston rod 80 moves the lever 84 outwardly as hereinabove described so as to open the circuit and the warning indicator 22 does not give a signal. It is of course understood that when the device is placed in operation that the main control switch 32 is closed and from that time on the warning indicator light 22 is responsive to the functioning of the wing switch or detector unit 20. Whenever the main control switch 32 is closed the circuit is closed through the warning light 22 except when the plane is in normal flight. In normal flight, as hereinabove described, the suction operated switch within the detector unit responds to the air flow through the Venturi restriction to open the circuit. Normally, however, such suction operated switch is closed and therefore at all times whenever the main control switch 32 is closed the circuit will be closed except as the suction switch is opened in response to normal flight of the plane.

What I claim is:

1. A warning indicator for airplanes comprising, in combination, an electrical circuit, a warning signal in said circuit, switch mechanism in said circuit, a detector unit mounted upon the upper trailing surface of a wing of the plane provided with a Venturi passageway extending fore and aft of the plane and disposed above the upper surface of the wing at such a distance as to be outside of the boundary layer of air over the wing during normal flight of the plane but to be within said boundary layer of air when the plane is approaching a stall, pressure responsive mechanism communicating with the restriction through the Venturi passageway to respond to a predetermined variation in the rate of air flow therethrough operable to actuate said switch mechanism.

2. A warning indicator for an airplane having an electric circuit in which circuit is disposed an electric warning device, and electric contacts located on the upper trailing surface of a wing of the plane, said warning indicator comprising a detector unit body adapted to be mounted on the upper trailing surface of said wing and having a Venturi passageway extending fore and aft therethrough and disposed above the upper surface of the wing when the detector unit body is mounted thereupon at such a distance thereabove as to be outside of the boundary layer of air over the wing during normal flight of the plane but to be within said boundary layer of air when the plane is approaching a stall, pressure responsive mechanism disposed within the body of the detector unit communicating with the Venturi restriction therein, electric switch mechanism disposed within the body of the detector unit connected with the pressure responsive mechanism to be actuated thereby, electric contacts connected with the switch mechanism and adapted to be connected with the electric circuit contacts on the wing when the detector body is mounted thereupon.

3. A warning indicator for an airplane having an electric circuit in which circuit is disposed an electric warning device, and electric contacts located on the upper trailing surface of a wing of the plane, said warning indicator comprising a detector unit body adapted to be mounted on the upper trailing surface of said wing and having a Venturi passageway extending fore and aft therethrough and disposed above the upper surface of the wing when the detector unit body is mounted thereupon at such a distance thereabove as to be outside of the boundary layer of air over the wing during normal flight of the plane but to be within said boundary layer of air when the plane is approaching a stall, pressure responsive mechanism disposed within the detector unit body on one side of the Venturi passageway therethrough and communicating with the restriction thereof, electric switch mechanism disposed within said body on the opposite side of the Venturi passageway therethrough and connected with the pressure responsive mechanism to be actuated thereby, electric contacts connected with the switch mechanism and adapted to be connected with the electric circuit contacts on the wing when the detector unit body is mounted thereupon.

4. A warning indicator for an airplane having an electric circuit in which circuit is disposed an electric warning device, and electric contacts located on the upper trailing surface of a wing of the plane, said warning indicator comprising a detector unit body adapted to be detachably mounted on the upper trailing surface of said wing and having a Venturi passageway extending fore and aft therethrough and disposed above the upper surface of the wing when the detector unit body is mounted thereupon at such a distance thereabove as to be outside of the boundary layer of air over the wing during normal flight of the plane but to be within said boundary layer of air when the plane is approaching a stall, piston and cylinder mechanism within the detector unit body, said cylinder communicating on one side of its piston with the Venturi restriction and on the other side of its piston with the atmosphere, electric switch mechanism within the detector unit body coupled with the piston to be actuated thereby, electric contacts connected with the switch mechanism and adapted to be connected with the electric circuit contacts on the wing.

GORDON H. ARNOLD.

REFERENCES CITED

The following references are of record in the file of this patent:

UNITED STATES PATENTS

| Number | Name | Date |
| --- | --- | --- |
| 2,296,528 | Lacoe | Sept. 22, 1942 |
| 2,349,982 | Murray-Waller | May 30, 1944 |
| 2,373,089 | Allen et al. | Apr. 10, 1945 |
| 2,406,719 | Upson | Aug. 27, 1946 |

OTHER REFERENCES

Article on page 752 of the Dec. 1944 issue of "Instruments."

N. A. C. A. Technical Note No. 670 of Oct. 1938 (Stall-Warning indicator).